(12) United States Patent
Bandy et al.

(10) Patent No.: US 6,563,084 B1
(45) Date of Patent: May 13, 2003

(54) PROBE FOR TOUCH SENSING

(75) Inventors: Robert Lawrence Bandy, Concord, OH (US); Carl Steven Kalkhof, Mentor, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 5 days.

(21) Appl. No.: 09/927,079

(22) Filed: Aug. 10, 2001

(51) Int. Cl.$^7$ ............................................. B23K 9/127
(52) U.S. Cl. ..................................... 219/124.34; 901/42
(58) Field of Search ..................... 219/124.34, 124.22; 901/42

(56) References Cited

U.S. PATENT DOCUMENTS

| | | | |
|---|---|---|---|
| 4,249,062 A | * 2/1981 | Hozumi et al. | 219/124.34 |
| 4,284,871 A | 8/1981 | Mawson et al. | |
| 4,296,306 A | * 10/1981 | Nomura et al. | 219/124.34 |
| 4,439,664 A | 3/1984 | Toohey | |
| 4,530,456 A | 7/1985 | Michelotti | |
| 4,642,752 A | 2/1987 | Debarbieri et al. | |
| 5,264,677 A | * 11/1993 | Sato et al. | 219/124.34 |
| 6,452,134 B2 | * 9/2002 | Hong | 219/124.34 |

FOREIGN PATENT DOCUMENTS

| | | | | |
|---|---|---|---|---|
| JP | 57-202977 | * 12/1982 | | 219/124.34 |
| SU | 988505 | * 1/1983 | | 219/124.34 |

* cited by examiner

*Primary Examiner*—Clifford C. Shaw
(74) *Attorney, Agent, or Firm*—Fay, Sharpe, Fagan, Minnich & McKee

(57) ABSTRACT

A probe for touch sensing to determine the position of a workpiece in a robot welding system using a robot driven welding gun for advancing a welding wire in a given direction toward a workpiece. The gun is movable by a robot controlled arm in a selected weld path and the probe comprises a rigid, elongated feeler with a touch tip which feeler is carried by a mechanism fixed with respect to the gun and movable by the mechanism between a retracted position and a known extended position wherein the feeler extends from the mechanism a fixed distance having an outermost contact point for the touch tip where the point has a known spatial relation to the gun. A detector detects when the contact point touches the workpiece to locate the workpiece. Several touches are used to determine the orientation of the workpiece for automatic welding.

16 Claims, 5 Drawing Sheets

```
I/O      DO IO = ON                LOGIC 0
            CLOSE SW1

TOUCH SEARCH SEQUENCE
       CLOSE SW2

TOUCH 1

TOUCH 2

TOUCH 3

TOUCH n

TOUCH SEARCH END
       OPEN SW2

DO IO = OFF                        LOGIC 1
       OPEN SW1
```

FIG. 6

PROBE FOR TOUCH SENSING

The present invention relates to the art of electric arc welding by a robot driven welding gun and more particularly to a novel probe used for touch sensing the position of the workpiece in a robot welding application.

BACKGROUND OF INVENTION

In welding where an electric arc welding gun is moved along a preselected path by a robotic mechanism, it is first necessary to determine the position of the workpiece prior to initiation of the welding operation. This can be done manually; however, mass production and operator free robot welding installations require a system for determining the location of the workpiece and, thus, orienting the gun with respect to the welding process to be accomplished. In practice this orientation procedure involves a computer program wherein the welding wire extending from the gun is moved into engagement with the workpiece at several positions to determine the actual spatial location of the welding path. The use of the welding wire to repeatedly engage the workpiece for sensing the position of the workpiece creates substantial difficulty, especially when the welding wire is aluminum. The torch or gun is moved by the robotic arm in several directions to use the welding wire as a touch sensing feeler. The several points detected by the wire generate the orientation of the workpiece. The wire must touch the workpiece several times and it must not bend, deflect or be forced back into the welding gun. It is often necessary to include a brake in the gun for holding the welding wire in the gun so it remains fixed with respect to the gun during the touch sensing sequence controlled by the computer operating the robot. The wire must extend from the gun a known fixed distance. This requires clipping of the wire and then extending the wire from the gun before the touch sensing sequence can be performed by the computer generated sequence of movements for the sensing procedure. To assure that the welding wire is not pushed back into the gun, the robotic touch sensing sequence often involves moving the gun at an angle with the wire extending out of the gun at an angle. This produces deflection of the wire and some inconsistencies in the location of the weld to be performed. Since the wire is quite fragile, the gun must be moved slowly during each of the touch sensing steps used to generate points for creating the location of the workpiece. This is the general background to which the present invention is directed.

In Debarbieri U.S. Pat. No. 4,642,752, a rigid feeler is mounted adjacent the welding torch or gun in a manner to detect a fixed portion of the workpiece to register the location of the workpiece. This type of fixed feeler has not been used extensively since it inhibits operation of the welding gun in confined areas. However, this patent is incorporated by reference herein as background information. Michelotti U.S. Pat. No. 4,530,456 and Mawson U.S. Pat. No. 4,284,871 show the use of a vertical sensing probe used to locate the height of a torch above the workpiece. Such probes operate in the Z axis and merely move downwardly with the soldering or welding torch until the probe is against the workpiece. This locates the height of the torch. There is no use of these devices to locate the path to be welded during a robotic welding operation. These two patents are also incorporated by reference as background information.

Toohey U.S. Pat. No. 4,439,664 is an example of a welding torch that uses the wire extending from the torch as a probe to locate the seam being welded. This disclosure is similar to the general concept used for robotic arc welding processes in that the welding wire itself forms the outwardly depending locating feeler. This particular patent shows a vertical movement of the welding gun for the purposes of locating the workpiece and not an angled use of the welding wire as is normal practice in arc welding processes now being performed in computer controlled robotic equipment. Toohey is also incorporated by reference as background information.

THE INVENTION

The present invention relates to a probe for touch sensing to determine the position of a workpiece in a robotic welding system and an improved system using the novel probe. In accordance with the invention, a rigid, elongated feeler with a touch tip is mounted in a mechanism adjacent the welding gun of the robotic welding system so that the contact point of the touch tip can be extended by instructions from the computer program to a fixed distance beyond the end of the welding gun. In this fixed extended position, the feeler is moved by a computer program to touch the workpiece at many locations. In practice, six to eight touches are used to determine the exact position of the workpiece preparatory to the welding operation. The feeler is fixed with respect to the welding gun so that the determined orientation calculated by the computer will determine the exact spatial location of the welding path to be processed by the computer movement of the welding gun. The invention does not present the problems associated with using the extended welding wire as the feeler moved into several locations for the purposes of generating a computer analysis of the exact location of the workpiece. When using the wire for the purposes of touch sensing, the wire can only be moved downward by the movement of the welding gun at a rate of about 15 millimeters per second. By using the present invention, the probe can be moved by the robotic arm at a rate of approximately 200 millimeters per second. Consequently, the six to eight steps used in a touch sensing program are performed using the present invention in about eight minutes. The same process using the extended welding wire requires over twenty minutes and causes bending of the wire causing less accurate location. Indeed, the wire must be held in the gun, clipped and extended a fixed distance before the wire is useable for the touch sensing program. The present invention allows the fixed feeler to be used rapidly without concern for distortion during the processing. When seven touches are necessary for locating a weld position, the use of the fixed feeler of the present invention is extremely advantageous by saving time and resulting in better accuracy.

The invention involves the novel probe and also the concept of retracting the probe after the touch sequence has been processed by the computer program used for the robotic welding of the workpiece. The probe is parallel to the wire and is moved into the extended operative position. Thereafter, it is retracted into an inoperative position where it is not capable of interference with movement of the welding gun during welding. The wire extending from the welding gun is not used for the location of the workpiece. Thus all of the disadvantages previously associated with such procedure are avoided. Although it is preferable that the feeler or probe be parallel to the welding gun the probe may be at a fixed angle to the welding gun. This position of the probe or feeler introduces complexity in the computer programming and also cause a certain amount of inaccuracy in the touch sensing process. By using the invention, there is no need to provide a brake in the gun to hold the welding wire in a fixed position for touch sensing. Furthermore, it is not necessary to contact the workpiece at an angle although this can be done if the computer program requires such orientation of the probe constructed in accordance with the present invention.

The retractable touch sensing probe is used on an arc welding robot to aid in the sensing of workpiece orientation. It is rigid and retractable so that there is no deformation of the sensing device. The cycle time is substantially reduced and the probe retracts, allowing unrestricted weld torch or gun movement along the weld path. In the practical implementation of the present invention, the probe consists of a pneumatic cylinder using a two way pneumatic solenoid valve to shift the rigid feeler into the extended touch position or the retracted operative position. A standard output bus merely activates the solenoid valve to move the probe outward into the operative position. The electromechanical device for operating the solenoid valve, in one embodiment also functions to close a switch that applies a voltage to the probe. This voltage is then measured by the computer or electric arc welder for indication of a touch to the workpiece by a detector. When the voltage level plunges, contact of the feeler or probe with the workpiece is detected. By using standard robot touch sensing software, the novel probe is linked to the touch sense I/O outlet to determine when the probe is extended for the processing inputting data calculated by the software program. The same digital output that extends the probe also connects the probe to a positive output voltage. This creates an open circuit with the touch sensing voltage being the voltage between the probe and the workpiece. When the robot touches the workpiece, the voltage potential between the two points drops. This is detected by either the robot controller or the welding power supply if equipped with a standard touch sensing capability. After the various touches have been recorded to calculate the position of the workpiece, the probe retracts so it no longer extends past the torch body of the gun, thereby allowing the welding process to proceed uninhibited.

In accordance with the present invention, there is provided a probe for touch sensing to determine the position of a workpiece in a robot welding system using a robot driven welding gun for advancing a welding wire in a given direction toward the workpiece. The welding gun or torch body is movable by a robot controlled arm in a selected weld path. The probe comprises a rigid, elongated feeler with a touch tip. The feeler is carried by a mechanism fixed with respect to the gun or torch body and movable by the mechanism between a retracted position and a fixed, known extended position wherein the feeler extends from the mechanism a fixed distance having an outermost contact point for the touch tip. This point has a known relationship to the gun. A detector detects when the contact point touches the workpiece. This is done by applying a voltage to the feeler to present a known voltage between the feeler and workpiece. When the feeler touches, the voltage decreases and is detected as a "touch" in the touch sensing program sequence of the robot.

In accordance with another aspect of the present invention, the feeler extends parallel to the extended direction of a gun or torch body. Thus, when the feeler is extended, it is moved by the robot during the touching sequence just as the torch would be moved, but with a certain offset. In practice, the moving mechanism is a cylinder mounted on the gun and the feeler is carried by a piston movable in the cylinder when the feeler moves between the two positions. A lower chamber in the cylinder and below the piston receives pressurized fluid from a electromechanical operated valve to introduce the fluid into the lower chamber. This moves the feeler from the extended position to the retracted position. It is possible to force the probe in the extended position by use of a spring with the fluid pressure moving the feeler against the spring to retract the feeler. In a like manner, a chamber above the piston is used in practice to shift the feeler into the extended position. When this occurs, the feeler moves against the stop in the cylinder to set the outermost contact point of the feeler. The valve for directing fluid either to the upper chamber or the lower chamber is operated by electromechanical device, such as a solenoid operated by a relay. In practice, one switch is closed by the electromechanical device to connect the voltage to the feeler. Another switch is closed to shift the valve between the retract position and the extended position. In practice, the switches are operated optically to prevent noise.

In accordance with another aspect of the invention there is provided a touch sensing system for a computer controller robot welding system wherein a robot driven welding gun advances a welding wire in a given direction toward the workpiece. The welding gun is movable by a robot controlled arm in a selected weld path controlled by the computer. The system comprises a computer program to output a touch sense signal and a probe including a rigid, elongated feeler with a touch tip and having an extended position and a retracted position. An electromagnetic device is used for closing a first switch and second switch upon creation of the touch sensing signal. A fluid cylinder shifts the feeler into the extended position upon closing of the first switch. A voltage source is connected to the feeler upon closing of the second switch. A detector is used for detecting a reduction in the voltage to indicate touching of the feeler against the workpiece. The program also creates several movement steps to sequentially move the feeler against the workpiece at diverse locations so a program processes the detections of the steps to orient the gun with respect to the workpiece. This system can be used on all robots using touch sensing to locate the welding path.

The primary object of the present invention is the provision of a probe to be used in a robot welding system. The probe includes an extended active position and a retracted inactive position.

Yet another object of the present invention is the provision of a probe, as defined above, which probe is rigid and elongated and overcomes the disadvantages of using a flexible welding wire as the feeler for a touch sensing sequence in a computer controlled robot system.

Still a further object of the present invention is the provision of a system for touch sensing to determine the position of a workpiece. The system involves the use of a novel probe, as defined above.

These and other objects and advantages will become apparent from the following description taken together with the accompanying drawings.

PREFERRED EMBODIMENT

Figure 1:
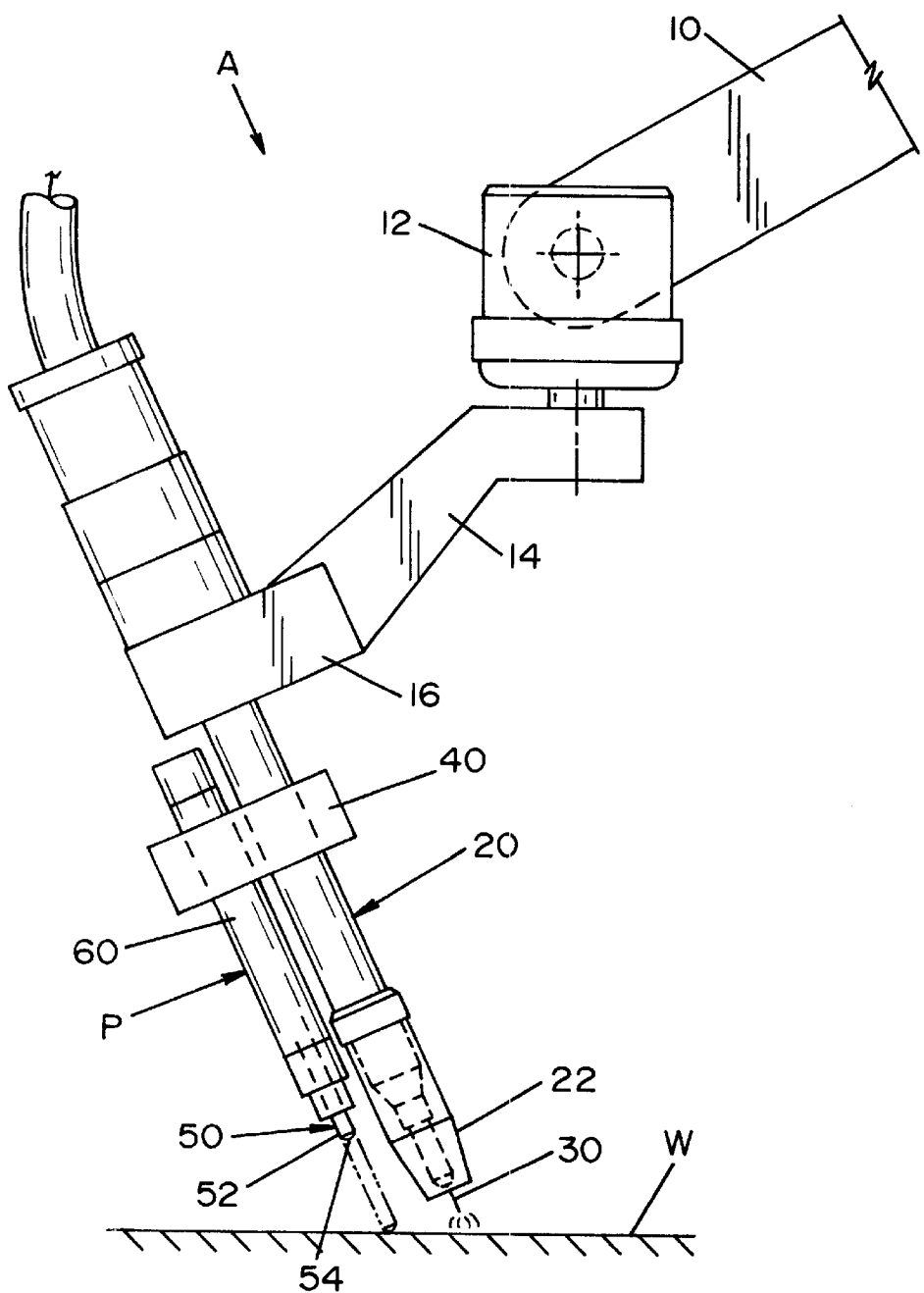
FIG. 1 is a side elevational view of the preferred embodiment of the present invention.
Figure 2:
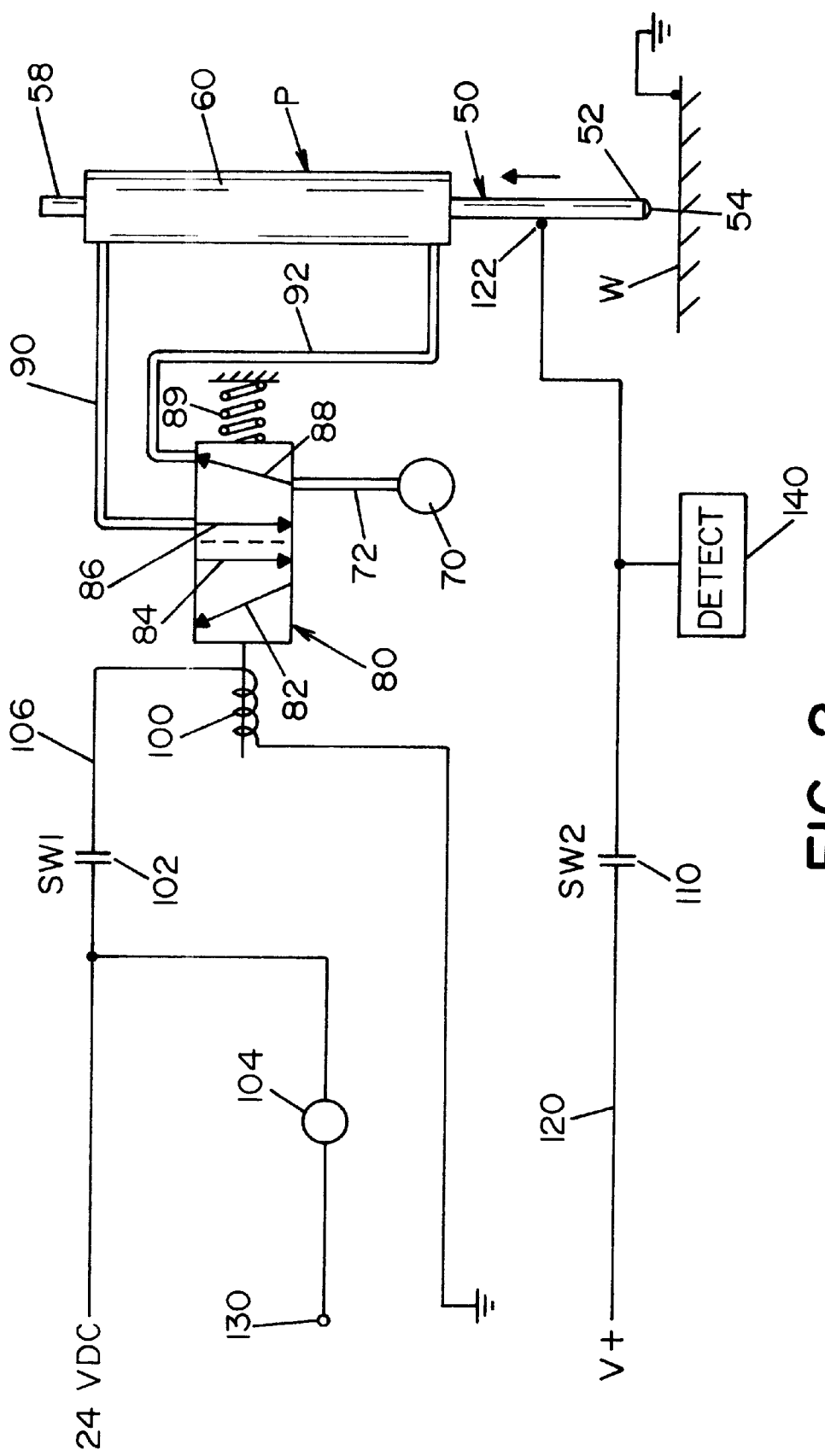
FIG. 2 is a wiring and hydraulic diagram used in the preferred embodiment of the present invention.
Figure 3:
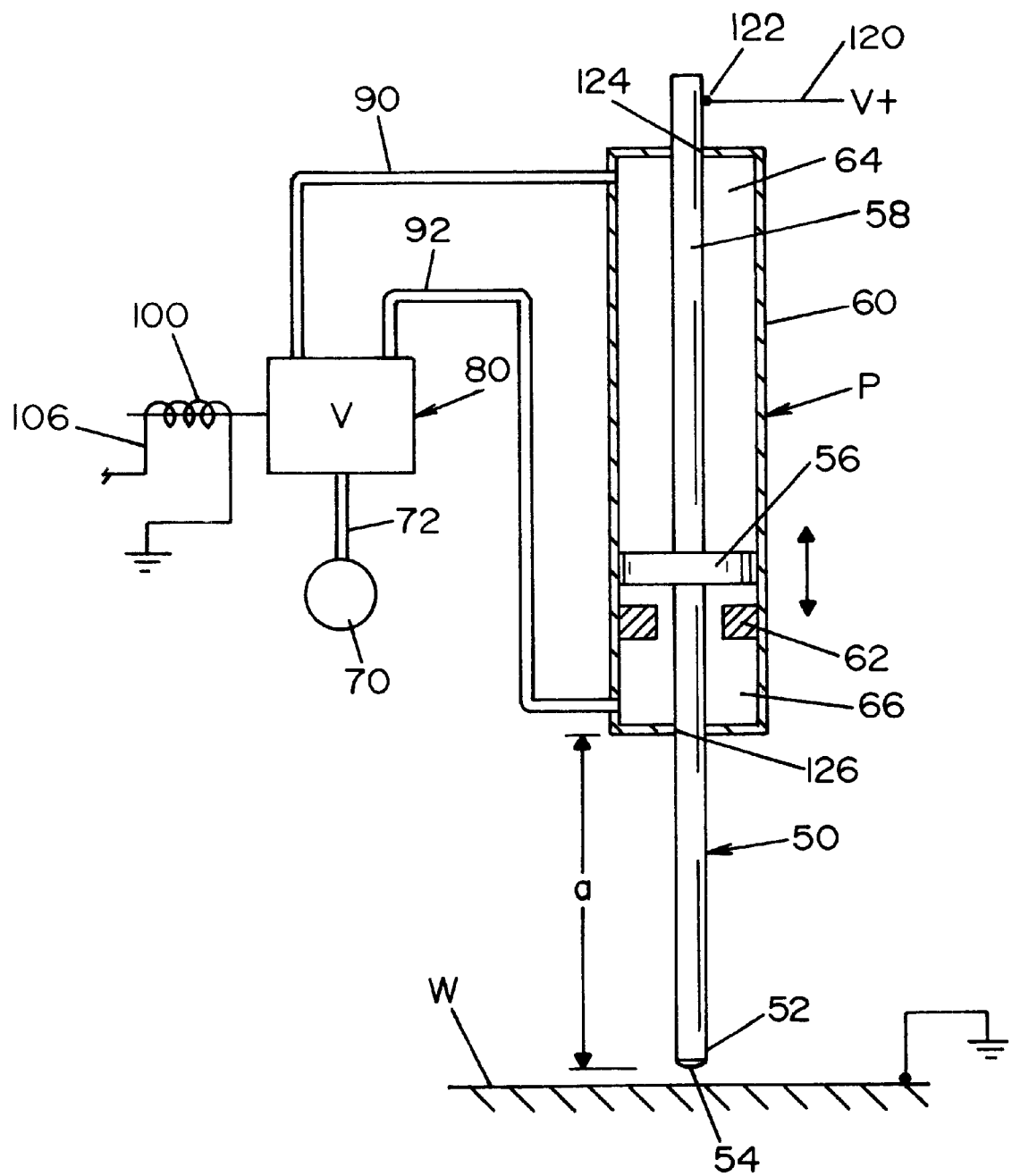
FIG. 3 is a schematic drawing showing certain details of the operating mechanism and probe or feeler used in the preferred embodiment of the present invention.
Figure 4A:
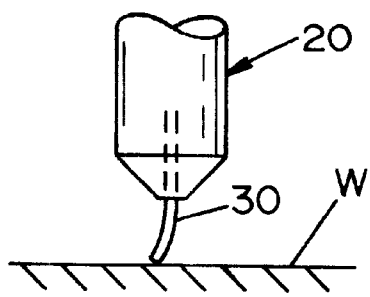
FIG. 4A is a partial view of the prior art embodiment.
Figure 4B:
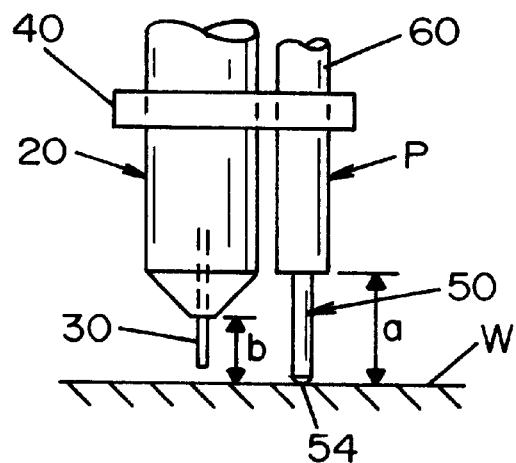
FIG. 4B is a view similar to FIG. 4A showing the preferred embodiment of the present invention.

Referring now to the drawings, wherein the showings are for the purpose of illustrating the preferred embodiments of the invention only and not for the purpose of limiting same, FIGS. 1–3 show a robot welding system A for welding along a path on workpiece W utilizing a robot control arm 10 with an outer manipulation joint 12 carrying a gun support arm 14 supporting a gun and torch holder 16. This standard arrangement for a robotic system supports a torch or gun 20 having an outer gas shield 22 and an advancing welding wire 30 whereby electrical current through wire 30 melts the end of the wire and a portion of the workpiece to form a weld joint along a path controlled by movement of robot arm 10 and manipulation joint 12. In this manner, the torch or gun is moved along a preselected path as the welding process is continued to weld a joint along such path. It is necessary to determine the position of the workpiece W prior to initiation of the welding operation. This is done in practice by a touch sensing process or sequence wherein the robot moves the gun in a preselected movement sequence to test the position of various points on the workpiece. These points, normally numbering six to seven, are processed in the computer controlling the robot so that the exact location of the workpiece is known prior to the welding procedure. As previously described, this touch sensing sequence normally involved, as the touch feeler, the extended welding wire 30. The gun is moved in various directions and positions with a voltage sensing arrangement for determining when the wire touches the workpiece. By using six to eight points, the location of the workpiece is known. This process has substantial disadvantages as discussed in the introductory portion of this description. These problems are solved by the present invention involving a novel probe P mounted in parallel with gun 20 by a mounting arrangement or clamp 40. Probe P includes a rigid, elongated feeler 50 having an outwardly extending touch tip 52 with an outermost contact point 54, as best shown in FIGS. 2 and 3. The feeler is moved between an extended operative position shown in FIG. 3 and a retracted inoperative position shown in FIG. 1. A mechanism is used for moving feeler 50 between these two defined positions. In practice, the moving mechanism 60 is a cylinder receiving feeler 50 having a sealed piston 56 slidable in the cylinder. Other mechanisms could be used, such as electromagnetic or mechanical devices without departing from the intended spirit and scope of the invention. In the preferred embodiment, cylinder 60 includes stop 62 that defines the outermost position of feeler 50 so contact point 54 is a known distance a from mechanism 60. In this embodiment of the operating mechanism, there is an upper fluid chamber 64 and a lower fluid chamber 66. In practice, a spring could be located in chamber 64 for holding the feeler in the operative extended position. In practice, both chambers 64, 66 receive pressurized fluid from supply 70 by way of fluid input line 72. Two position valve 80 includes a first set of operative bores 82, 84 that define the extended touch sense position of feeler 50 and a second set of bores 86, 88 defining the retracted position of the feeler. As shown in FIG. 2, valve 80 is in its rest position where spring 89 maintains the valve in the feeler retracted position. Line 90 communicates valve 80 with the upper chamber and line 92 communicates the valve with the lower chamber. Solenoid 100 is activated when switch 102 is closed by relay 104 to cause current flow through line 106. Relay 104 also closes switch 110 connecting sensing voltage V+ on line 120 to feeler 50 at connecting point 122. In practice, this point is at the top of shaft 58 extending outward from cylinder 60 through sealed opening 124 similar to lower sealed opening 126 for the extended part of feeler 50. Probe P is shifted into the extended operative position by a logic 0 on I/O terminal DO10 illustrated as terminal 130 from the robotic control. In operation, when the touch sensing program shown in FIG. 6 is called for implementation, a logic 0 appears at the I/O terminal 130. This closes relay 104 closing switch 102 and switch 110. Solenoid 100 shifts valve 80 to the left causing pressurized fluid to enter upper chamber 64. Piston 56 is forced downwardly against stop 62 so that the outermost position of point 54 is at distance a. This distance is known with respect to welding torch or gun 20 so that the touch sequence program can be implemented. As shown in FIG. 4B, the distance a is substantially below the tip of the gun indicated as distance b. In practice, this distance is between ½ inch and 1 inch. With the probe down in the extended position, the switches SW1 and SW2 are close. Arm 10 and joint 12 move the probe in a particular direction indicated by program as "Touch 1". Thereafter, the program steps "Touch 2", "Touch 3", etc. are implemented. The controller detects shorting of feeler 50 by a detector device illustrated in FIG. 2 as block 140. When this detector shows a plunge or reduction of voltage on line 120, a "touch" indication parameter is loaded into the memory of the computer used to control the robot. After all of these positional detections or "touches" are recorded, the program in FIG. 6 transitions to the end of the sequence. This opens switch SW1 and opens switch SW2 by providing a logic 1 at terminal 130. In accordance with another aspect of the invention, the voltage control switch 110 can be operated separately from relay 104 whereby the computer will open switch 110 preparatory to a logic 1 appearing at terminal 130. By processing the program shown in FIG. 6 with the novel probe illustrated in FIGS. 1–3, the exact position of workpiece W is known to the robot. Then, the robot moves the torch or gun 20 along the path while wire 30 is advanced toward the workpiece where the arc welding process is performed. This system and novel probe results in the advantages discussed in this disclosure. The prior art concept is illustrated in FIG. 4A wherein wire 30 is used for the detection sequence program shown in FIG. 6. The welding wire has a tendency to bend or distort, especially when using aluminum wire, to produce substantially distorted orientation information regarding the position of workpiece W. The invention overcomes this disadvantage.

Figure 5:
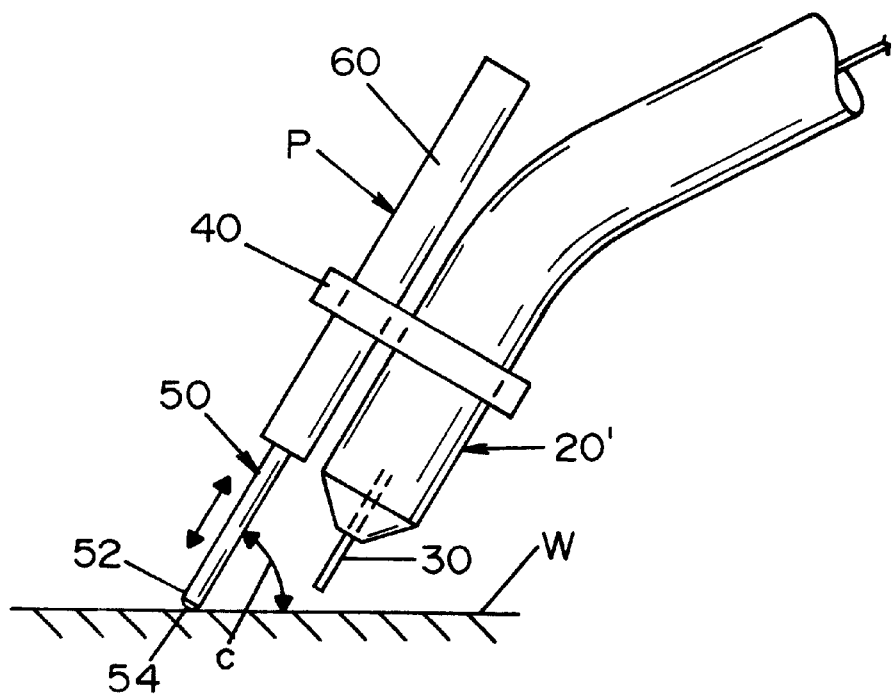
FIG. 5 is a side elevational view of a modification of the invention where the torch or gun is angled; and, FIG. 6 is a computer program used in practicing the preferred embodiment of the present invention.

In FIG. 5, a bent torch 20' includes a parallel mounted probe P as previously described. In this instance, the probe forms an angle c with respect to the workpiece. This is the same angle as wire 30 assumes during the welding process. The present invention, when using a torch or gun 20', implements a computer program that compensates for the angles c. In practice, it is preferred that the probe 50 be parallel to wire 30. In accordance with another implementation, there is an angle between the feeler 50 and wire 30. This angle is known and used by the computer for the touch sensing sequence program shown in FIG. 6. Different algorithm calculations are made by the computer and do not change the implementation and concept of the present invention.

Having thus defined the invention, the following is claimed:

1. A probe for touch sensing to determine the position of a workpiece in a robot welding system using a robot driven welding gun for advancing a welding wire in a given direction toward said workpiece, said gun being movable by a robot controlled arm in a selected weld path, said probe comprising a rigid, elongated feeler with a touch tip, said feeler being carried by a mechanism fixed with respect to said gun and movable by said mechanism between a retracted position and a known extended position wherein said feeler extends from said mechanism a fixed distance having an outermost contact point for said touch tip, said point having a known spatial relation to said gun, and a detector for detecting when said contact point touches said workpiece to locate the workpiece, including a switch to connect a voltage source to said feeler and said detector detects a drop in said voltage, and including a stop associated with said mechanism defining said fixed distance, said gun has an extended end and said point is a fixed distance from extended end, and wherein said feeler is in said retracted position when said gun is being moved in said selected weld path.

2. A probe as defined in claim 1 wherein said feeler extends parallel to said given direction.

3. A probe as defined in claim 2 wherein said mechanism is a cylinder mounted on said gun and said feeler is carried by a piston movable in said cylinder when said feeler moves between said two positions.

4. A probe as defined in claim 3 wherein said mechanism includes a lower closed chamber in said cylinder and below said piston, a source of pressurized fluid and a valve for introducing aid fluid from said source into said lower chamber to move said feeler from said extended position to said retracted position.

5. A probe as defined in claim 4 including a chamber above said piston and a valve for introducing said fluid from said source into said upper chamber to move said feeler from said extended to said retracted position.

6. A probe as defined in claim 2 including a switch to connect a voltage source to said feeler and said detector detects a drop in said voltage.

7. A probe as defined in claim 6 including a stop associated with said mechanism defining said fixed distance.

8. A probe as defined in claim 2 including a stop associated with said mechanism defining said fixed distance.

9. A probe as defined in claim 2 wherein said gun has an extended end and said point is a fixed distance from extended end.

10. A probe as defined in claim 9 wherein said fixed distance is in the general range of ½–1 inch.

11. A probe as defined in claim 1 wherein said mechanism includes a lower closed chamber in said cylinder and below said piston, a source of pressurized fluid and a valve for introducing said fluid from said source into said lower chamber to move said feeler from said extended position to said retracted position, including a chamber above said piston and a valve for introducing said fluid from said source into said upper chamber to move said feeler from said extended to said retracted position.

12. A touch sensing system for a computer controlled robot welding system wherein a robot driven welding gun advances a welding wire in a given direction toward a workpiece, said gun being movable by a robot controlled arm in a selected weld path controlled by said computer, said system comprising a computer program to output a touch sensing signal, a probe including a rigid, elongated feeler with a touch tip, said feeler having an extended position with said tip at a known location with respect to said gun and a retracted position, an electromagnetic device for closing a first switch and a second switch upon creation of said touch sensing signal, a fluid cylinder to shift said feeler into said extended position upon closing of said first switch, a voltage source connected to said feeler upon closing of said second switch and a detector for detecting a reduction in said voltage to indicate touching of said feeler against said workpiece, including program created movement steps to sequentially move said feeler against said workpiece at diverse locations and a program to process said detections at said steps to orient said gun with respect to said workpiece, said feeler extends parallel to said given direction, and including deactivating said electromagnetic device and retracting said feeler after said steps have been completed.

13. A system as defined in claim 12 wherein said electromagnetic device is a relay.

14. A system as defined in claim 12 wherein said switches are operated optically.

15. A probe as defined in claim 12 wherein said gun has an extended end and said point is a fixed distance from extended end.

16. A system as defined in claim 12 wherein said fixed distance is in the general range of ½–1 inch.

* * * * *